United States Patent [19]

Hurley

[11] 4,216,384
[45] Aug. 5, 1980

[54] SYSTEM FOR MONITORING AND CONTROLLING ELECTRIC POWER CONSUMPTION

[75] Inventor: Frederick A. Hurley, Miami, Fla.

[73] Assignee: Directed Energy Systems, Inc., Miami, Fla.

[21] Appl. No.: 859,099

[22] Filed: Dec. 9, 1977

[51] Int. Cl.² ............................................ H02J 13/00
[52] U.S. Cl. ..................................... 307/39; 307/35; 307/41
[58] Field of Search ...................... 307/39, 41, 38, 62; 324/103 R

[56] References Cited

U.S. PATENT DOCUMENTS

| | | | |
|---|---|---|---|
| 3,271,580 | 9/1966 | Pope | 307/39 |
| 4,023,043 | 5/1977 | Stevenson | 307/38 |
| 4,031,406 | 6/1977 | Leyde | 307/41 |

Primary Examiner—L. T. Hix
Assistant Examiner—S. D. Schreyer

Attorney, Agent, or Firm—Morgan, Finnegan, Pine, Foley & Lee

[57] ABSTRACT

A system is disclosed for monitoring and controlling the consumption of electrical energy and the peak demand for electrical power in an installation. The system can be programmed to automatically limit the instantaneous power consumption of the installation in accordance with the time of day and the required need of the facility. The system sheds appropriate individual loads when the total instantaneous power consumption exceeds the pre-selected set point applicable for the time in question, to thereby return the power consumption of the installation to within this allowable limit. Provision is made for selective load shedding whereby the relative size of the load shed corresponds with the relative degree of power overdraw. In addition, after each shedding event, the system automatically realigns the order of priority by which the loads are shed. Furthrmore, all shed loads are automatically reset to an operative condition on a periodic basic, according to the operating requirements of each load.

18 Claims, 7 Drawing Figures

SYSTEM FOR MONITORING AND CONTROLLING ELECTRIC POWER CONSUMPTION

BACKGROUND OF THE INVENTION

This invention relates to a system for monitoring and controlling the consumption of electrical energy and the peak demand for electric power.

Under many electrical utility company rate structures, the billing charge for electricity supplied to an installation is calculated on the basis of a two-part formula: a consumption charge based upon the total Kilowatt-hours of electrical energy consumed during the billing period; and a demand charge based upon the maximum kilowatt capacity or "peak demand" required during the billing period. The "peak demand" is the highest demand maintained over a continuous interval of time specified by the utility, typically 15 to 30 minutes. Thus the billing charge for electricity for an installation can be reduced both by decreasing the total energy consumption over the billing period and by decreasing the peak demand for electrical power.

In many installations, and particularly in commercial installations such as restaurants, stores, factories, hospitals and the like, much of the electrical equipment is thermostat-controlled, and cycles on and off at the command of its own thermostat. As a consequence, certain electrical equipment, such as restaurant air conditioners, refrigerators, cooking equipment and the like, are often operated simultaneously regardless of the time of day or the changing requirements of the particular installation. Moreover, when most or all of the equipment in an installation is "on" at the same time, the electrical demand rises toward its maximum, resulting in an increased demand charge in the electrical billing.

It is an object of the present invention to provide a relatively low cost system for monitoring and controlling the consumption of electrical energy and the peak demand for electrical power.

It is a further object of this invention to provide a control system which is easily connected to an existing electrical supply system with little rewiring.

It is another object of this invention to provide a control system which can be programmed to automatically limit the instantaneous power consumption of an installation.

It is still another object of this invention to provide a control system which can be programmed to automatically limit the instantaneous power consumption in accordance with the time of day and the required need of the facility.

It is a still further object of this invention to provide a control system which can control the instantaneous electrical power consumption of an installation at no detriment or loss of efficiency to the overall function of the installation.

BRIEF DESCRIPTION OF THE INVENTION

The system of the present invention controls the electrical power demand and consumption of an installation by limiting its total instantaneous current draw or power consumption.

The system sheds appropriate individual loads when the total instantaneous power consumption exceeds a pre-selected, programmed limit or "set point", to thereby maintain the power consumption of the installation within this allowable limit. Thus, the billing charge for electricity for the installation can be minimized in accordance with the particular requirements of the installation.

A system according to the invention is designed for installation at or near the usual circuit breaker panel. Magnetic couplings are used to sense total incoming current and the current in each of the various load lines emerging from the individual circuit breakers. Switching circuitry operated by the load shedding system can be added to the individual lines adjacent to the circuit breaker panel.

A suitable time program is established, setting the maximum desired set point current for different periods of the day. The actual total power consumption at any given time is compared with the set point value and, if the set point value is exceeded, the system begins shedding selected loads as necessary to bring the system within the programmed set point value. Loads which have been shed by the system are subsequently automatically restored to operation after a relatively short period (typically 3 to 15 minutes, depending on the type of load device). Other loads are shed if an excess in total power consumption is registered after a previously shed load is restored to operation.

One of the features of the system according to the invention is the provision for selected load shedding in accordance with the relative degree of power overdraw. If a relatively large excess of power is being used beyond the desired set point, the system automatically selects a large power consuming load device for shedding. If only a small excess is registered, a small power-consuming load device is selected for shedding. In this manner, the system avoids shutting down a large number of small devices to eliminate a large power overdraw and keeps to a minimum the number of load devices shed. Furthermore, additional levels of discrimination—e.g., high, intermediate, low—can be readily included in the system.

Another feature of the system according to the invention is the provision for automatically changing the priority by which loads are shed. In most commercial installations, there are a variety of electrical load devices that can be turned off for short periods of time without any noticeable effect on performance. For example, an air conditioning system or a refrigerator could be turned off for 3 or 5 minutes without significantly affecting its average cooling performance over a longer period of time. Other load devices can be shut down if necessary, but are preferably left undisturbed. Furthermore, regarding those load devices which can suitably be turned off for short periods of time, it is preferable to avoid always selecting the same device for shedding each time a power overdraw occurs. The system in accordance with the invention provides for variable shedding priorities such that, after each shedding occasion, the loads are re-arranged for shedding in a different priority, but those load devices which are preferably left undisturbed always remain last in priority for shedding.

Still another feature of the system according to the invention is the provision for automatically resetting to an operative condition all shed loads on a periodic basis to limit the normal "off" time for the load. This periodic resetting of shed loads also enables the system to re-evaluate whether a power overdraw still exists with the formerly shed load returned to operative condition. If so, the system again sheds a load to bring the total power consumption of the installation back within the allowable limit. The priority realignment circuitry minimizes the chance that the load which has just been restored to operative status will be the next one shed. If an overdraw does not exist when the formerly shed load is restored to operative status—perhaps because one of the electrical devices in the installation was turned off or has cycled off at the command of its own internal circuitry, or because a new set point is in effect—then no shed signal will be generated.

Some electrical devices can be shut down for longer periods of time than other devices, without detrimental consequences. The system according to this invention provides for individual programming to control the shut-down time for each load device according to its operating characteristics. Furthermore, the system is designed so that the load devices are always restored to operation one at a time, in order to avoid large power surges which would result from restoration of several devices to operation at the same time.

BRIEF DESCRIPTION OF THE DRAWINGS

The manner in which the foregoing and other objects are achieved according to the invention is described more fully in the following specification which sets forth an illustrative embodiment of the invention. The drawings form a part of the specification, wherein:

FIG. 6 (comprising FIGS. 6a and 6b) is a schematic diagram of the shed circuits, the sequential load reset circuits, and the individual disconnect circuits of the preferred embodiment.

DETAILED DESCRIPTION OF THE INVENTION

Figure 1:
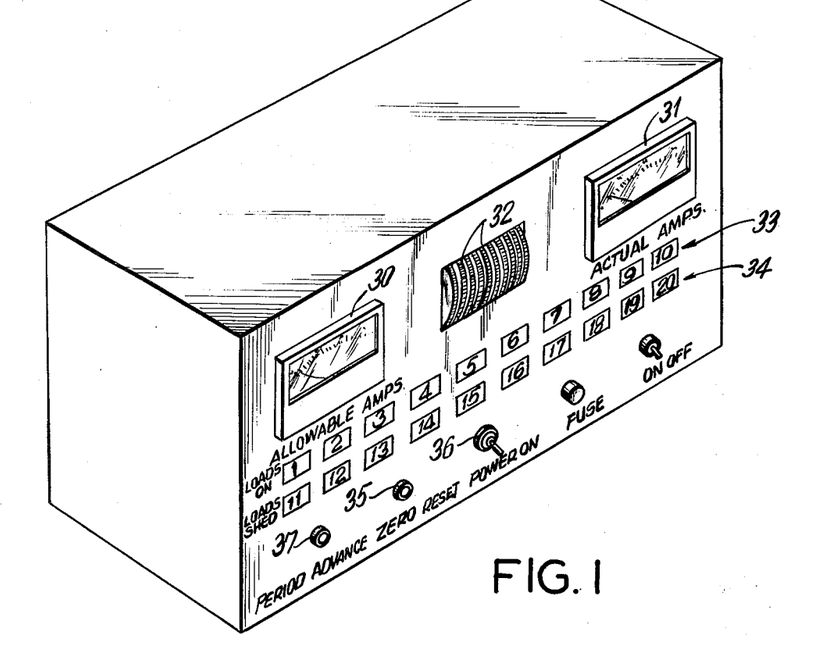
FIG. 1 is a perspective view showing the front panel of one embodiment of a control system device according to the present invention.

FIG. 1 is a perspective view of the front panel of the preferred embodiment of the control system according to the present invention, showing the "Allowable Amps" meter 30, the "Actual Lamps" meter 31, thumbwheel switches 32, "Loads On" lamps 33, "Loads Shed" lamps 34, Zero Reset button 35, Period Advance button 37, and power-on switch 36.

Figure 2:
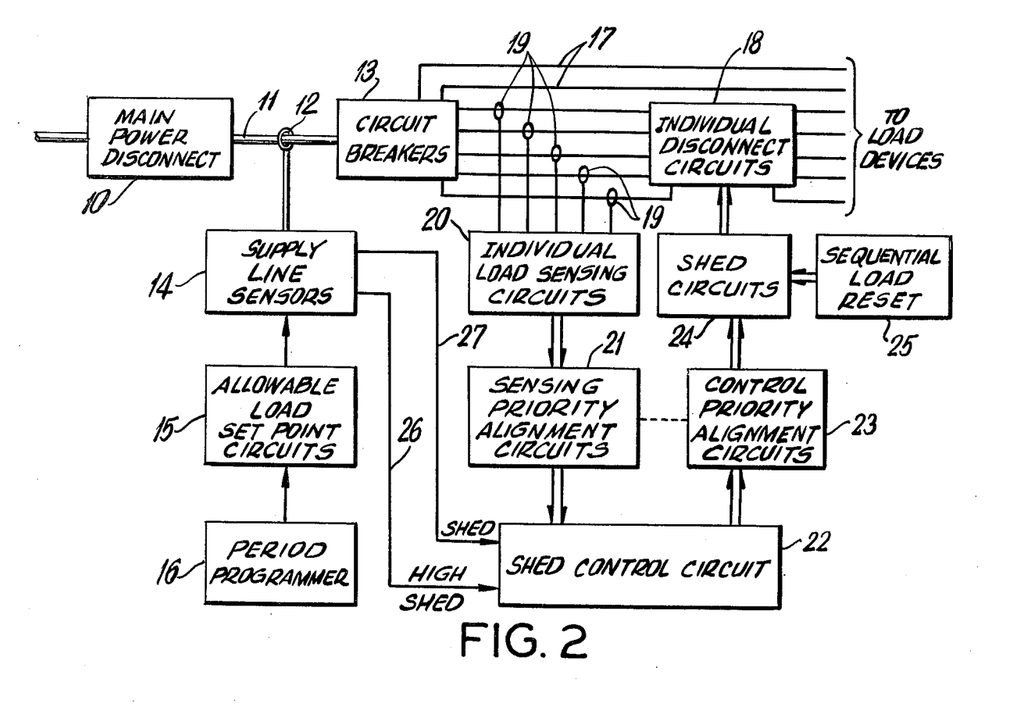
FIG. 2 is a block diagram illustrating the operation of the preferred embodiment of the control system according to the present invention.

FIG. 2 is a block diagram of the control system according to the present invention. The details of the individual circuits are more fully described below in connection with FIGS. 3 through 6.

Monitoring of the instantaneous power consumption of the installation is accomplished by supply line sensors 14 which are coupled to the main supply line conductor 11 by means of a current transformer 12. The current transformer 12 is of conventional design, including a multi-turn secondary winding which surrounds the conductor 11 so that the latter acts as the transformer primary. The current transformer is conveniently connected to the main supply line conductor 11 at a point between the main power disconnect 10 and the circuit breakers 13 which control current flow to the individual load devices within the installation.

The supply line sensors 14 work in conjunction with the allowable load set point circuits 15 and the period programmer 16 which provide an indication of the maximum allowable power consumption for various time periods during the day. The period programmer 16 includes a 24-hour clock by which the day can be divided into discrete periods, each of which may be assigned a different maximum allowable set point value. The allowable load set point circuits 15 establish the set point for each period. The supply line sensors 14 compare the actual current in conductor 11 with the allowable set point for that period of time and, if the actual current exceeds the set point, provide a "shed" signal on conductor 27; moreover, if a large excess over the set point is detected, the supply line sensors 14 also provide a "high shed" signal on conductor 26.

In a typical installation the power is distributed to the individual load circuits via individual circuit breakers 13. In the system according to the invention, some loads cannot reasonably be shed—e.g., lighting circuits—and these loads are preferably left undisturbed; thus, the supply lines 17 for these loads are routed around the individual disconnect circuits 18. The supply lines for the remaining loads pass through individual disconnect circuits 18, which disconnect or shed loads under control of the system. Individual current transformers 19 couple each of the supply lines for the disconnectable loads to the individual load sensing circuits 20. The individual load sensing circuits 20 provide an output signal for each active load, i.e., each load which is drawing current from the supply line 11.

The sensing priority alignment circuits 21 determine the sequential priority for the shedding of loads. Preferably the loads are grouped in categories according to size. Although the loads can be divided into as many size categories as desired, in the illustrative system set forth, the loads are divided into only two categories, i.e., large and small loads. The sensing priority alignment circuits 21 establish a shedding priority for each category.

If a small overload is detected by supply line sensors 14, as indicated by a shed signal only on line 27 (i.e., no signal on line 26), shed control circuit 22 seeks a small load for shedding. The small load group is surveyed in the order indicated by sensing priority alignment circuits 21 until an active load is encountered. This load is shed. If an overload still exists, the system continues to scan the loads until another active load is encountered, which load is then also shed, and so on.

If a large overload is detected by supply line sensors 14, as indicated by both a "shed" signal on conductor 27 and a "high shed" signal on conductor 26, the shed control circuit 22 seeks a load in the large load group for shedding, and in similar fashion checks the large loads in accordance with the priority alignment for large loads.

When a load is to be shed, it is disconnected by the individual disconnect circuits 18, which include an individual solid state switching circuit for each of the lines supplying a disconnectable load. Shed control circuit 22 is coupled to the disconnect circuits 18 via shed circuits 24 and control priority alignment circuits 23. As will be explained below, the control priority alignment circuits 23 and the sensing priority alignment circuits 21 operate in tandem, in order to maintain the same coupling between the shed control circuit 22 and the individual disconnect circuits 18 as exists between the shed control circuit 22 and the individual load sensing circuits 20.

A sequential load reset circuit 25 acts to automatically restore shed loads to operative status in order to limit the maximum shed time for each load. Some loads can be conveniently shed for a relatively short period of time, such as 3 minutes, without any noticeable effect upon their performance, whereas other load devices can be shed for longer periods of time. The connection of the sequential load reset circuit is established according to the type of load being controlled, and limits the maximum shed time of each load so as not to unduly interfere with the performance of the load device. At the end of the limit period for the load device, it is automatically restored to active service.

When a load is restored to service by the sequential load reset circuit 25, an overload may result. If so, the system begins a new shed cycle. However, since the priority alignment circuits 21 and 23 re-arrange the shedding priority after each shedding cycle, a different load or set of loads will normally be shed in order to bring the power consumption of the installation back within the allowable set point value.

The operation of the control system of FIG. 2 is described in more detail in connection with FIGS. 3-6 which are detailed schematic diagrams for the various circuits of the system.

SUPPLY LINE SENSORS

Figure 3:
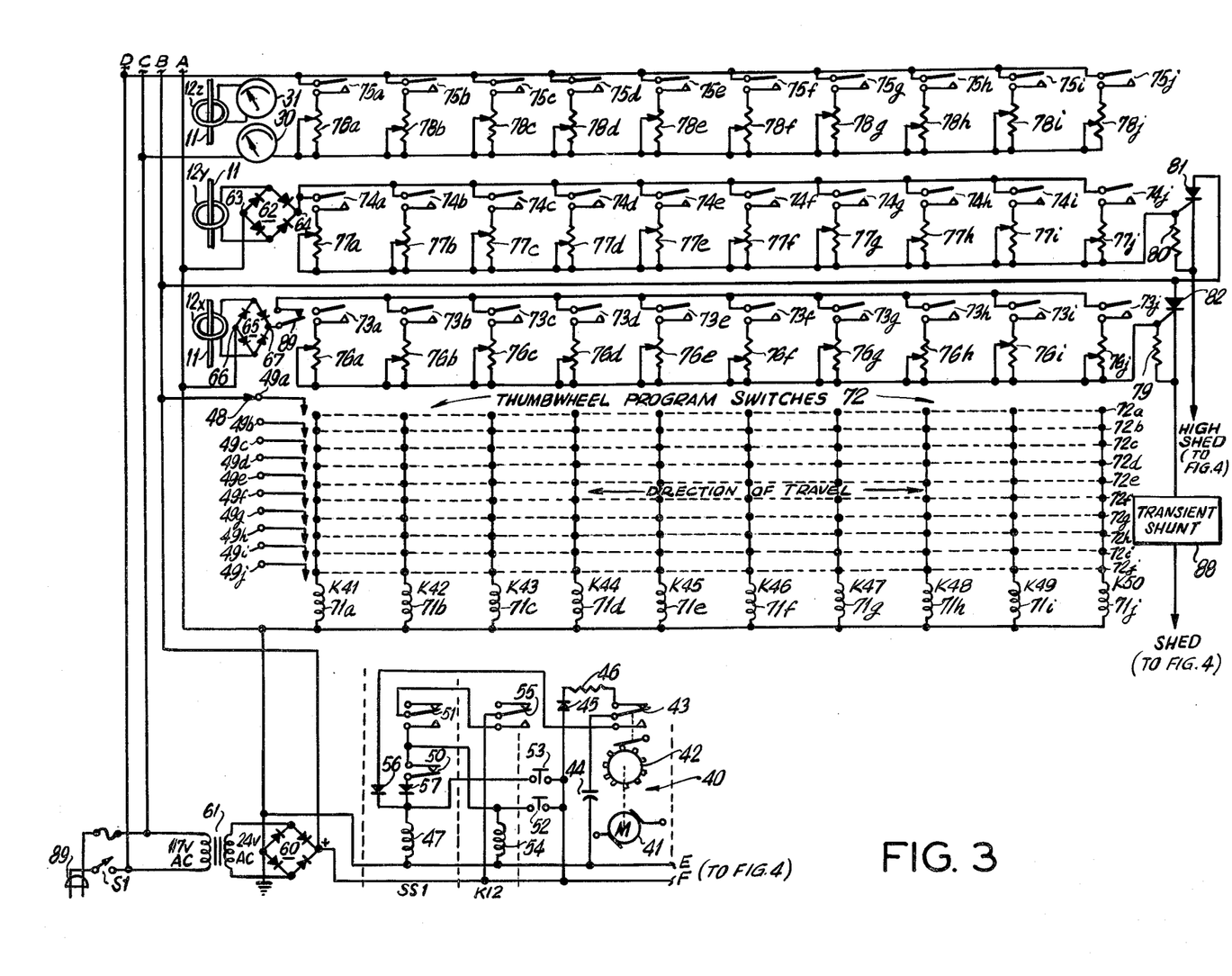
FIG. 3 is a schematic diagram showing the supply line sensors, the period programmer, and the allowable load set point circuits of the preferred embodiment.

The supply line sensors 14 (FIG. 2) are schematically illustrated in FIG. 3 and include current transformers 12x, 12y, and 12z coupled to one or more legs of the incoming utility supply line 11. The output of transformer 12x is connected to a full-wave bridge rectifier 65; the output of transformer 12y is connected to full-wave bridge 62. A third transformer 12z is connected to meter 31, which displays "Actual Amps" on the front panel in FIG. 1. Transformers 12x, 12y, and 12z are conveniently located along the incoming main power supply line 11 adjacent the circuit breaker panel 13.

The supply line sensors 14 respond to the flow of current in supply line 11. When current flows in the supply line, induced current flows in the transformer secondary windings proportional to the flow of current in the supply line. This results in a proportional DC value appearing at the output of bridge rectifier 62 at terminals 63 and 64, and at the output of bridge 65 at terminals 66 and 67.

PERIOD PROGRAMMING CIRCUIT

Period programming circuit 16 is shown schematically in FIG. 3 and includes a 24-hour time switch 40 capable of producing pulses at selected 15-minute intervals to advance a stepping switch SS-1.

The time switch 40 includes a synchronous motor 41 energized from an AC source and connected to drive a programmable cam 42 which in turn actuates the timer contacts 43. Movable contact 43 is connected to one plate of capacitor 44, the other plate being connected to ground. The normally closed contact associated with movable contact 43 is coupled to the positive supply via diode 45 and a charging resistor 46. The associated normally open contact is connected through diode 56 to one end of the energizing coil 47 of stepping switch SS-1, the other end of coil 47 being connected to ground.

Cam 42 makes one revolution each 24 hours and can be programmed by inserting pins at appropriate locations so as to momentarily actuate movable contact 43 at selected times: e.g., 7 A.M., 7:45 A.M., 10:30 A.M., etc. Between actuations of movable contact 43, capacitor 44 is charged via resistor 46 and diode 45. When movable contact 43 is actuated, the capacitor discharges via coil 47 of stepping switch SS-1.

Stepping switch SS-1 is a conventional ten position rotary stepping switch having a wiper contact 48 that cooperates with ten stationary contacts 49a–49j. Wiper contact 48 advances one position upon each separate actuation of energizing coil 47. Stepping switch SS-1 includes interrupter springs 50 which open when the wiper contact is between stationary contact positions, and also includes "off-normal" contacts 51 which are in the position shown in FIG. 3 only when wiper contact 48 is at the "home" position (connected to stationary contact 49a).

A momentary contact push-button switch 52 is connected to return stepping switch SS-1 to the home position. Switch 52 is connected between the plus supply and one end of energizing coil 54 of a relay K12, the other end of coil 54 being connected to ground. The movable contact 55 of relay K12 is connected to the plus supply and the associated normally open contact is connected to the movable contact 51 of the off-normal contact of stepping switch SS-1. The normally open contact associated with movable contact 51 is connected directly to coil 54 of relay K12, as well as indirectly to coil 47 of stepping switch SS-1 via interrupter springs 50 and a diode 57.

When push-button switch 52 is actuated, relay K12 is momentarily activated and supplies voltage through contacts 55 to off-normal contacts 51 of SS-1. If stepping switch SS-1 is at other than the home position, coil 54 of relay K12 is energized and remains energized until the stepping switch SS-1 reaches the home position, at which time movable contact 51 of SS-1 returns to the normal position shown in FIG. 3. While coil 54 is energized, coil 47 of stepping switch SS-1 is also energized via contacts 55 of K12 and thence via off-normal contacts 51 and interrupter springs 50 of SS-1, to thereby advance stepping switch SS-1 step-by-step until reaching the home position.

Momentary contact push-button switch 53 is connected to advance the wiper 48 of stepping switch SS-1 by one position each time the switch is actuated. Switch 53 is connected between the plus supply and energizng coil 47 of stepping switch SS-1. Actuation of switch 53 momentarily energizes coil 47 via the plus supply line, which in turn causes wiper 48 to advance one position.

Push-button switch 53 is shown in the Panel Display of FIG. 1 as "Period Advance" button 37. Push-button switch 52 is shown in FIG. 1 as "Zero Reset" button 35. As described immediately above, the Zero Reset button 35 enables the operator of the system to reset the period programmer 16 to a specific starting point, which may, for example, correspond to 12 o'clock midnight. The Period Advance button 37 enables the operator to advance the system one step at a time to other set point values.

The purpose of Period Advance button 37 and Zero Reset button 35 is to permit the operator, when calibrating, servicing or inspecting the system, to conveniently place the system under the control of any one of the programmed set point values. When installing the machine, the operator can, for example, "zero set" the system to the midnight set point value, and then "period advance" the system to the actual time interval and set point value then applicable.

When the system is in operation, the twenty-four hour cam timer 42 is advanced by synchronous motor 41, and actuates contacts 43 at certain pre-programmed times determined by the pin locations in cam timer 42. Each time contact 43 is actuated, capacitor 44 is discharged via contacts 43 and diode 56 to momentarily energize winding 47, to in turn advance the stepping switch SS-1 one position. Since the illustrated embodiment includes a ten-position stepping switch (49a–49j) there should be ten pins in cam wheel 42. If for example, the pins are set at 7:00 A.M., 7:45 A.M., and 10:30 A.M., and at seven other locations, then the stepping switch is at the home position 49a prior to 7:00 A.M., at the position associated with stationary contact 49b between 7:00 A.M. and 7:45 A.M., at the position associated with stationary contact 49c from 7:45 to 10:30 A.M., and so forth.

ALLOWABLE LOAD SET POINT CIRCUITS

Allowable Load Set Point Circuits 15 (FIG. 2) include ten thumbwheel program switches 72a–j (shown at 32 in FIG. 1) which correspond to the ten programmable intervals of time provided by the illustrated embodiment. Positioning of each thumbwheel switch selects the set point values for the respective time interval by activating a selected one of the relays K41–K50 which in turn activates one of the potentiometers 76a–j to establish the desired set point; activates one of the potentiometers 77a–j to establish a high shed level; and activates one of the potentiometers 78a–j for indicating the "Allowable Amps" on meter 30 on the front panel of FIG. 1.

Figure 4:
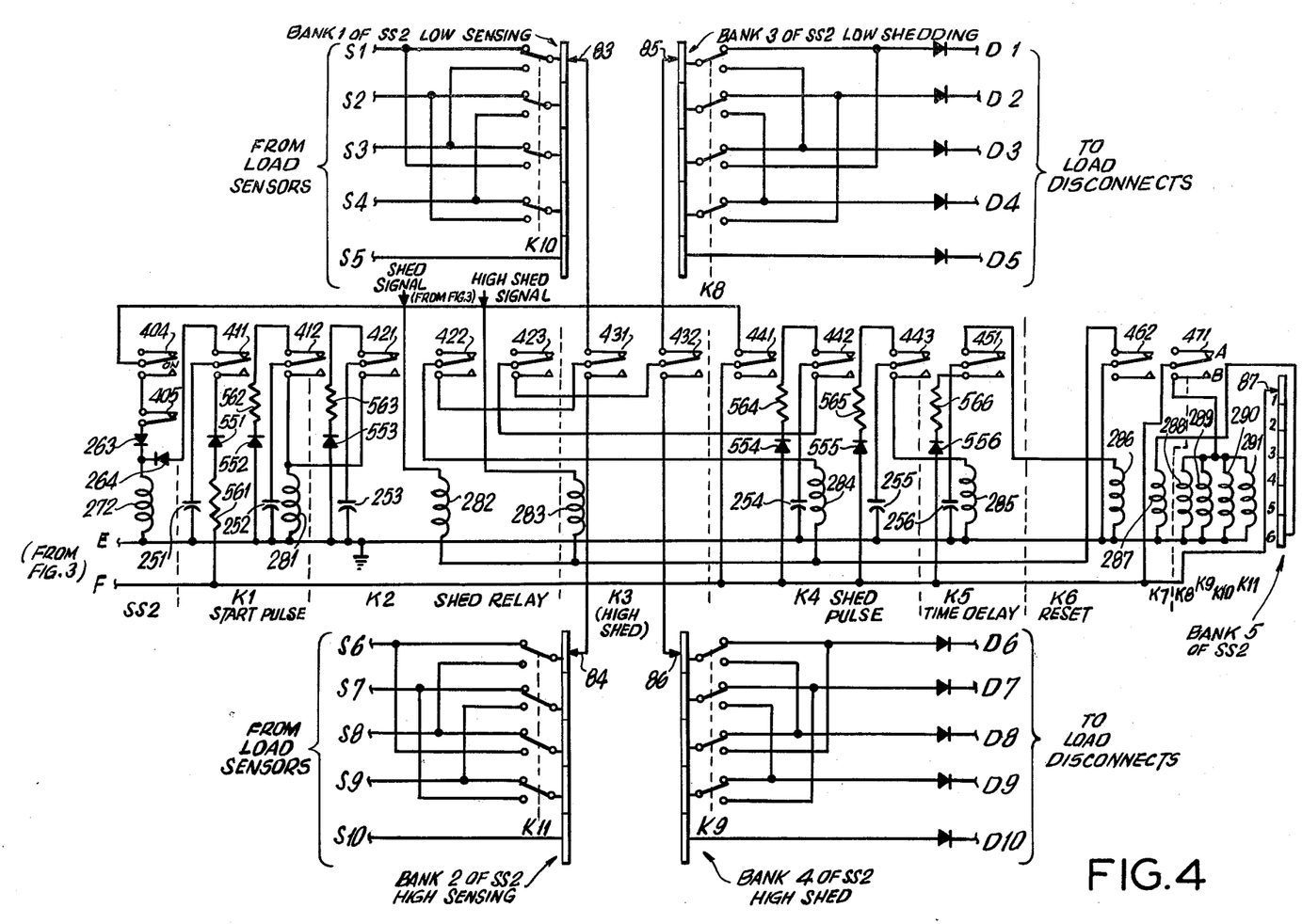
FIG. 4 is a schematic diagram showing the sensor priority alignment circuits, the control priority alignment circuits, and the shed control circuit of the preferred embodiment.

The sensing element for the "shed" signal is SCR 82 (FIG. 3) having its anode connected to the plus supply line and its cathode connected to ground via transient shunt circuit 88 and via energizing winding 282 of relay K2 (FIG. 4). One of the potentiometers 76a–j (depending upon which of relays K41–K50 is energized) is connected between the plus terminal 67 of bridge rectifier 65 in the supply line sensor and the gate of SCR 82. Resistor 79 is connected between the gate and cathode of the SCR to thereby form a voltage divider with the selected potentiometer. Thus, the potentiometer setting determines the potential required at terminal 67 of the supply line sensor to fire SCR 82.

SCR 81 is the sensing element for the "high shed" signal. The anode of this SCR is connected to the plus supply, and its cathode is coupled to ground via energizing winding 283 of relay K3 (FIG. 4). Potentiometers 77a–j connectable between terminal 64 of bridge rectifier 62 and the gate of SCR 81, similarly form a voltage divider with resistor 80 connected between the gate and cathode of the SCR.

Potentiometers 78a–j are connectable across the AC lines in series with an AC ammeter 30. Adjustment of the potentiometers provides the desired indication of "allowable amps" on meter 30.

The potentiometers 76a–j and 77a–j are individually adjustable to provide ten separate set points for the "shed" circuit and ten separate set points for the "high shed" circuit. In a typical installation these set points may be as follows:

| Relay | Set Point | High Set Point |
|-------|-----------|----------------|
| K41   | 90 Amps   | 95 Amps        |
| K42   | 110       | 115            |
| K43   | 120       | 125            |
| K44   | 130       | 135            |
| K45   | 140       | 145            |
| K46   | 150       | 155            |
| K47   | 160       | 165            |
| K48   | 170       | 175            |
| K49   | 180       | 185            |
| K50   | 200       | 205            |

As can be seen from the Table, the high shed set point is set at a value higher than the shed set point. Thus, in the example above, the high shed signal arises when the current in the supply line 11 exceeds the desired set point value by more than five amps.

The potentiometers are preferably calibrated by using adjustable dummy loads. For example, potentiometers 76a can be adjusted by placing a dummy load on the system adjusted to draw 90 amperes. Under these conditions, relay K41 is activated and potentiometer 76a is adjusted so as to just cause SCR 82 to fire. Potentiometer 78a is adjusted to provide an indication of 90 amps on meter 30. The dummy load is then adjusted to draw 95 amperes and potentiometer 77a is adjusted to just fire SCR 81 under these circumstances. The remaining potentiometers 76b–j, 77b–j and 78b–j are calibrated in similar fashion in accordance with the values in the above Table.

The thumbwheel program switches are used to select the desired set points for the specific time periods. Each thumbwheel switch is a ten position switch and is used to connect one of the stationary contacts 49a–j to a selected one of the relays K41–K50. For example, if stationary contact 49a corresponds to the period prior to 7:00 A.M., where a 90 ampere set point is desired, thumbwheel 72a is turned to the position connecting stationary contact 49a to winding 71a of relay K41. During this time period relay K41 is energized via wiper 48 and via the plus supply, closing contacts 73a, 74a, and 75a, and thereby connecting potentiometers 76a, 77a and 78a to establish a set point of 90 amperes and a high set point of 95 amperes.

If stationary contact 49b of stepping switch SS-1 corresponds to the period between 7:00 A.M. and 7:45 A.M. where a 120 ampere set point is desired, thumbwheel 72b is turned to the position where stationary contact 49b is connected to winding 71c of relay K43. In similar fashion, the set points for the other time periods are selected by adjusting the positions of thumbwheels 72c–j.

INDIVIDUAL LOAD SENSING CIRCUITS

Figure 5:
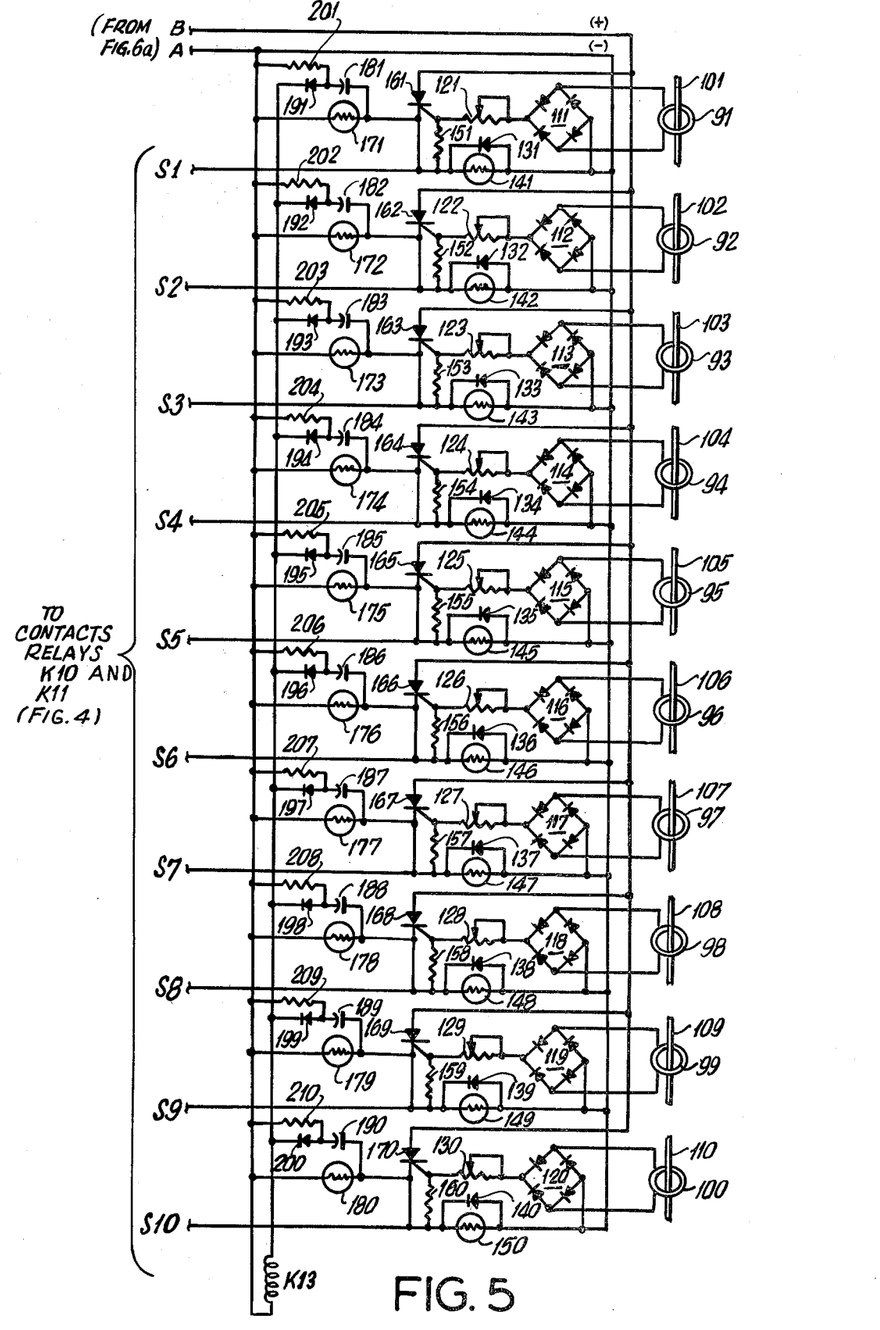
FIG. 5 is a schematic diagram of the individual load sensing circuits of the preferred embodiment.

The individual load sensing circuits are shown schematically in FIG. 5. A separate sensing circuit is associated with each of the controlled loads and is coupled to the supply line thereof by a current transformer. An SCR is the main sensing element in each circuit, and is rendered conductive when current flows through the particular individual supply line.

More specifically, the load sensing circuit for the first load is coupled to supply line conductor 101 by a current transformer 91. A bridge rectifier 111 is connected across the transformer secondary to provide a DC voltage proportional to the current supplied to the load via conductor 101.

SCR 161 has its anode connected to the plus supply. The cathode of SCR 161 is connectable to energizing coil 284 of relay K4 (FIG. 4) via the contacts of relay K10 (FIG. 4) in the priority alignment circuit and via the contacts of relays K2 and K3 of the shed control circuit (FIG. 4). As will be explained hereinafter, when the system looks for a load to shed, stepping switch SS-2 advances until finding an active load; relay K4 is then energized, which in turn initiates the sequence for shedding that load.

The signal for firing the SCR 161 is developed across resistor 151 connected between the gate and the cathode of the SCR. Resistor 151 is connected in series with a variable resistor 121 and an indicator lamp 141 across the DC terminals of bridge rectifier 111. Diode 131 is connected across lamp 141 to bypass inductive surges. Lamp 141 is located at circuit breakers 13 (FIG. 2).

When current flows through conductor 101, current flows through the voltage divider formed by resistors 121 and 151 to develop a potential across resistor 151 which renders SCR 161 conductive. Thus, when SCR 161 is conductive, the resulting signal indicates that the associated load is active and available for shedding. The adjustment of resistor 121 can be used for discriminating between large and small loads. The variable resistor can also be used to disable a sensing circuit (by setting the resistor to its maximum resistance value) to momentarily prevent shedding of a particular load.

Lamp 171 is connected between the cathode of SCR 161 and ground. Capacitor 181 is connected between the cathode of SCR 161 and resistor 201, the other side of resistor 201 being connected to ground. Diode 191 is connected between the junction of capacitor 181 and resistor 201 and one end of energizing coil of relay K13; the other end of the coil is connected to ground. Each time the first load becomes operative, SCR 161 sends a momentary signal to the energizing coil of relay K13 via capacitor 181 and diode 191. This momentary activation of relay K13 causes contacts 89 (FIG. 3) to operate, thereby interrupting the supply line sensing signal from full-wave bridge 65. The purpose of this circuitry will be explained below.

The load sensing circuits for the other loads supplied by conductors 102-110 are similarly constructed, and include current transformers 92-100, bridge rectifiers 112-120, SCR's 162-170, lamps 172-180, capacitors 182-190, diodes 192-200, and resistors 202-210, respectively. The cathodes of SCR's 162-170 are each connectable to relay K4 (FIG. 4) via the priority alignment circuits (relays K10 and K11; FIG. 4) and via relays K2 and K3 of the shed control circuit (FIG. 4) to indicate a load available for shedding. The momentary pulses through diodes 192-200 are all directed to the energizing coil of relay K13.

Although ten load sensing circuits are shown in the illustrative embodiment, it should be understood that the number of load sensing circuits corresponds to the number of sheddable loads controlled in the system.

SHED CONTROL CIRCUIT

The principal component in the shed control circuit is stepping switch SS-2, shown schematically in FIG. 4 In response to a shed signal, stepping switch SS-2 advances through a sequence until it detects a load available for shedding and then directs a shed command to the individual disconnect circuit associated with that load.

Stepping switch SS-2 includes an energizing coil 272, interrupter springs 405 and off-normal contacts 404. Wiper contact 83 cooperates with the stationary contacts of bank 1 of SS-2, which contacts are in turn connected to the load sensing circuits for the smaller loads (load sensors 1-5 in the illustrative embodiment) via the contacts of relay K10 in the priority alignment circuit. Wiper contact 84 cooperates with the stationary contacts of bank 2 of SS-2, which in turn are connected to the load sensing circuits for the larger loads (loads 6-10 in the illustrative embodiment) via the contacts of relay K11 in the priority alignment circuit. Wiper contact 85 cooperates with the stationary contacts of bank 3 which are connected to the load shedding circuits for the small loads via the contacts of relay K8 of the priority alignment circuits, and wiper contact 86 cooperates with the stationary contacts of bank 4 which are connected to the load shedding circuits for large loads via the contacts of relay K9.

SCR 82 (FIG. 3), which provides the "shed" signal, is connected to energizing coil 282 (FIG. 4) of relay K2 via an adjustable transient shunt circuit 88, and SCR 81 (FIG. 3), which provides the "high shed" signal, is connected to the energizing coil 283 of relay K3 (FIG. 4), the other ends of coils 282 and 283 being returned to ground via normally closed contacts 462 of reset relay K6. Thus, if a small current overdraw is detected, only relay K2 is energized, whereas if a large current overdraw is detected both relays K2 and K3 are energized.

The purpose of transient shunt circuit 88 is to eliminate all signals of brief duration which are headed toward coil 282 in the control circuit—for example, signals of less than one-half second duration—in order to avoid actuation of the system by the characteristic line surges and the transient electrical noise which emanates from the constant cycling and recycling of the equipment in the installation.

Contacts 421 and relay K1 provide a time-delayed start pulse to initiate movement of stepping switch SS-2 in response to a shed signal. Capacitors 251, 252 and 253 are connected between ground and movable contacts 411, 412 and 421 respectively. The normally closed contacts associated with movable contacts 412 and 421 are connected to the plus supply via capacitor charging circuits including, respectively, resistor 562 in series with diode 552 and resistor 563 in series with diode 553. The normally open contact associated with movable contact 411 is connected to the plus supply via resistor 561 in series with diode 551. The normally open contacts associated with movable contacts 412 and 421 are connected to the energizing coil 281 of relay K1 and the normally closed contact associated with movable contact 411 is connected to energizing coil 272 of stepping switch SS-2 via diode 264.

Upon receiving a shed signal, relay K2 is energized causing contacts 421 of relay K2 to close, discharging capacitor 253 to energize coil 281 of relay K1. Upon energization, relay K1 closes its contacts 412 to connect capacitor 252 to coil 281 of relay K1 in parallel with capacitor 253. Thus, relay K1 remains in the energized condition until the voltage across capacitors 252 and 253 decreases to the dropout voltage of relay K1.

Energization of relay K1 also closes contacts 411 to charge capacitor 251 through diode 551 and resistor 561. De-energization of relay K1 causes contact 411 to return to its normal position and capacitor 251 is therefore discharged through diode 264 to the energizing coil 272 of stepping switch SS-2, thereby causing stepping switch SS-2 to advance to the first off-normal position. Thus, energizing coil 272 is momentarily energized by the discharge of capacitor 251 following a predetermined delay (controlled by the discharge time constants of capacitors 252 and 253) after receipt of a "shed" signal by the shed control circuit.

Once stepping switch SS-2 has advanced away from the home position, it will continue to advance until relay K4 is energized in response to detection of a sheddable load. This is achieved by means of the normally closed contacts 441 of relay K4 connected between the plus supply and movable contact 404 of the off-normal contacts of SS-2. The normally open stationary contact associated with movable contact 404 is connected to energizing winding 272 of stepping switch SS-2 via interrupter springs 405 and diode 263. Thus, when stepping switch SS-2 moves away from its home position, contacts 404 close and winding 272 is energized from the plus supply via contacts 441, 404 and 405 so long as relay K4 remains in the de-energized state; therefore, stepping switch SS-2 advances step-by-step due to the action of the interrupter springs.

When only a "shed" signal is present, relay K4 is connected to wiper contacts 83 and 85, whereas when a "high shed" signal is also present, relay K4 is connected to wiper contacts 84 and 86. More specifically, one end of winding 284 of relay K4 is connected to movable contact 422 of relay K2, the associated normally open contact being connected to movable contact 431 of relay K3 and then to either wiper 83 or 84 depending on the state of relay K3. The other end of winding 284 is connected to ground via normally closed contacts 462 of reset relay K6. The normally open contact associated with movable contact 442 (where the load shedding pulse appears) is connected to movable contact 423 of relay K2, the associated normally open contact of which is connected to movable contact 432 and then to either wiper 85 or 86 depending on the state of relay K3. A capacitor 254 is connected between movable contact 442 of relay K4 and ground. The normally closed contact associated with movable contact 442 is connected to the plus via resistor 564 and diode 554.

If only a "shed" signal is present, relay K2 is energized and relay K3 remains de-energized, so that wipers 83 and 85 are coupled to relay K4. The shed signal causes stepping switch SS-2 to advance until a potential appears on one of the stationary contacts indicating a load available for shedding. The potential passes via wiper 83 and contacts 431 and 422 to energize winding 284 of relay K4. The previously charged capacitor 254 then discharges via contacts 442, 423 and 432 to supply a pulse to wiper contact 85. Since wipers 83 and 85 move together as stepping switch SS-2 advances, the shed pulse is supplied to the load disconnecting circuit corresponding to the load that was detected as available for shedding.

If both a "shed" signal and a "high shed" signal are present, relays K2 and K3 are energized so that wipers 84 and 86 are coupled to relay K4. When the stepping switch reaches a position corresponding to a sheddable load, current flows from wiper 84 via contacts 431 and 422 to energize relay K4 which in turn permits capacitor 254 to discharge to provide a shed pulse to wiper 86 via contacts 442, 443 and 432.

Reset relay K6 is actuated to open the ground circuits for windings 282, 283 and 284 of relays K2, K3, and K4, a predetermined time interval (as determined by relay K5) after actuation of relay K4. Upon the operation of relay K4, capacitor 255, connected between ground and movable contact 443 of relay K4, discharges to coil 285 of relay K5, energizing K5 and maintaining it in an energized condition until the discharge of capacitor 255 reaches the dropout voltage of coil 285. Contacts 451 of relay K5 charge capacitor 256 through diode 556 and resistor 566 while the relay K5 is energized. When relay K5 returns to the de-energized state, capacitor 256 discharges to coil 286 of relay K6. The discharge of capacitor 256 momentarily energizes relay K6, opens its contacts 462 and thereby opens the ground circuit for windings 282, 283 and 284 of relays K2, K3 and K4 respectively. When relay K4 returns to the de-energized state, the circuit is again completed between the plus supply and the "off-normal" contacts 404 of stepping switch SS-2, via contacts 441 of relay K4, causing stepping switch SS-2 to advance to its "home" position. This completes the shed cycle, and the system is ready to receive another shed signal for initiation of a new shed cycle.

Under certain circumstances, it may occur that the system detects a power overdraw and consequently develops a shed signal, but can find no load available to shed. Since it is likely that not all items of equipment in the installation are connected to the load-shedding system, the uncontrolled loads can themselves cause a power overdraw. Thus the system will have shed all available loads, but will still generate a shed signal due to the persisting overdraw situation. In such a circumstance, the shed control circuit will have unsuccessfully attempted to find a sheddable load, stepping switch SS-2 will have stopped through its cycle and come to rest in its home position, but relay K2 will remain energized since it continues to receive a shed signal from SCR 82. If nothing were done to deactivate relay K2, the system would be unable to shed any of the sheddable loads that subsequently became available for shedding.

To eliminate this problem relay K13 is used to momentarily deactivate relay K2 each time a sheddable load becomes available. The energizing coil of relay K13 is shown in FIG. 5, and the contacts 89 thereof are shown in FIG. 3. As explained above, each time a sheddable load becomes operable, a momentary signal is sent to relay K13 via the associated capacitor/diode assembly in the associated load sensing circuit, activating relay K13 and opening its contacts 89. For example, if load 3 becomes operable, SCR 163 conducts, sending a momentary signal to relay K13 via capacitor 183 and diode 193. Referring to FIG. 3, activation of relay K13 causes contacts 89 to open, interrupting the supply line sensing signal, rendering SCR 82 non-conductive, and thereby de-activating relay K2. Expiration of the momentary signal to relay K13 causes relay K13 to de-activate, closing contacts 89, re-introducing the supply line sensing signal to SCR 82, causing SCR 82 to conduct again and thereby to reactivate relay K2. Re-activation of relay K2 enables stepping switch SS-2 to begin its search for a load to shed.

PRIORITY ALIGNMENT CIRCUITS

The function of the sensing priority alignment circuits 21 (FIG. 2) and the control priority alignment circuits 23, (FIG. 2), is to realign the load shedding sequence in such a manner as to prevent a single load from being constantly selected as the first load shed, or the second, etc. This is accomplished in the illustrated embodiment by using a bistable relay to change the sequential position of the loads available for shedding. However, it is to be understood that the same basic circuit here disclosed may be readily expanded to permit tristable operation, quadri-stable operation, etc., thereby permitting further desired variety in the sequencing of the load shedding operation.

Referring to FIG. 4, the individual load sensing circuits S1-S4 for load lines 101, 102, 103 and 104 (FIG. 5) are connectable to the low sensing bank (bank 1 of SS-2) in the order S1-S4 via the normally closed contacts of a relay K10. The same load sensing circuits are also connectable to the first four stationary contacts of the low sensing bank in the order S3, S4, S1, S2 via the normally open contacts of relay K10. Load sensing circuit S5 is connected directly to the fifth stationary contact of the low sensing bank.

Similarly, the first four stationary contacts of bank 3 of stepping switch SS-2 (low shedding) are connectable to load disconnects D1-D4 respectively via the normally closed contacts of relay K8 and are connectable to load disconnects D3, D4, D1 and D2, respectively via the normally open contacts of relay K8. The fifth stationary contact is directly connected to load disconnect D5. Thus when relays K8 and K10 are de-energized as shown in FIG. 4, the sequence for the load shedding is loads 1, 2, 3, 4, 5, whereas if relays K8 and K10 are energized the sequence is 3, 4, 1, 2, 5.

Relays K11 and K9 similarly control the shedding alignment for the high loads 6-10. Load sensors S6-S9 are connectable to the first four stationary contacts of bank 2 of stepping switch SS-2 in the order S6, S7, S8, S9 via the normally closed contacts of relay K11 whereas the same load sensors are connectable thereto in the order S8, S9, S6, S7 via the normally open contacts of relay K11. The first four stationary contacts of bank 4 of stepping switch SS-2 are connectable to load disconnects D1, D2, D3, D4 respectively, via the normally closed contacts of relay K9 and are connectable to load disconnects D3, D4, D1, D2 respectively via the normally open contacts. Load sensor S10 is directly connected to the fifth contact of bank 2, and the fifth contact of bank 4 is directly connected to load disconnect D10. Thus, if relays K9 and K11 are in the de-energized state as shown in FIG. 4 the shedding sequence is 6, 7, 8, 9, 10 whereas if the relays are energized the shedding sequence is 8, 9, 6, 7, 10.

Energization of relays K8-K11 is controlled by a bistable relay K7. The bistable relay changes the position of movable contact 471 each time energizing coil 287 is momentarily energized. One of the stationary contacts of relay K7 is connected to windings 288-291 of relays K8-K11 in parallel. Thus, in one position of bistable relay K7 the relays K8-K11 are all energized and in the other state the relays K8-K11 are all de-energized.

Wiper 87 associated with bank 5 of SS-2 is connected to the plus supply and the sixth stationary contact of bank 5 is connected to one end of winding 287, the other end of the winding being returned to ground. Thus, at the end of each shedding cycle as stepping switch SS-2 returns toward the "home" position wiper 87 passes across the sixth stationary contact to momentarily energize winding 287 and thereby change the state of bistable relay K7. Therefore, the shedding priority alignment as established by the connection of relays K8-K11 changes after each shedding cycle.

SHED CIRCUITS

Figure 6A:
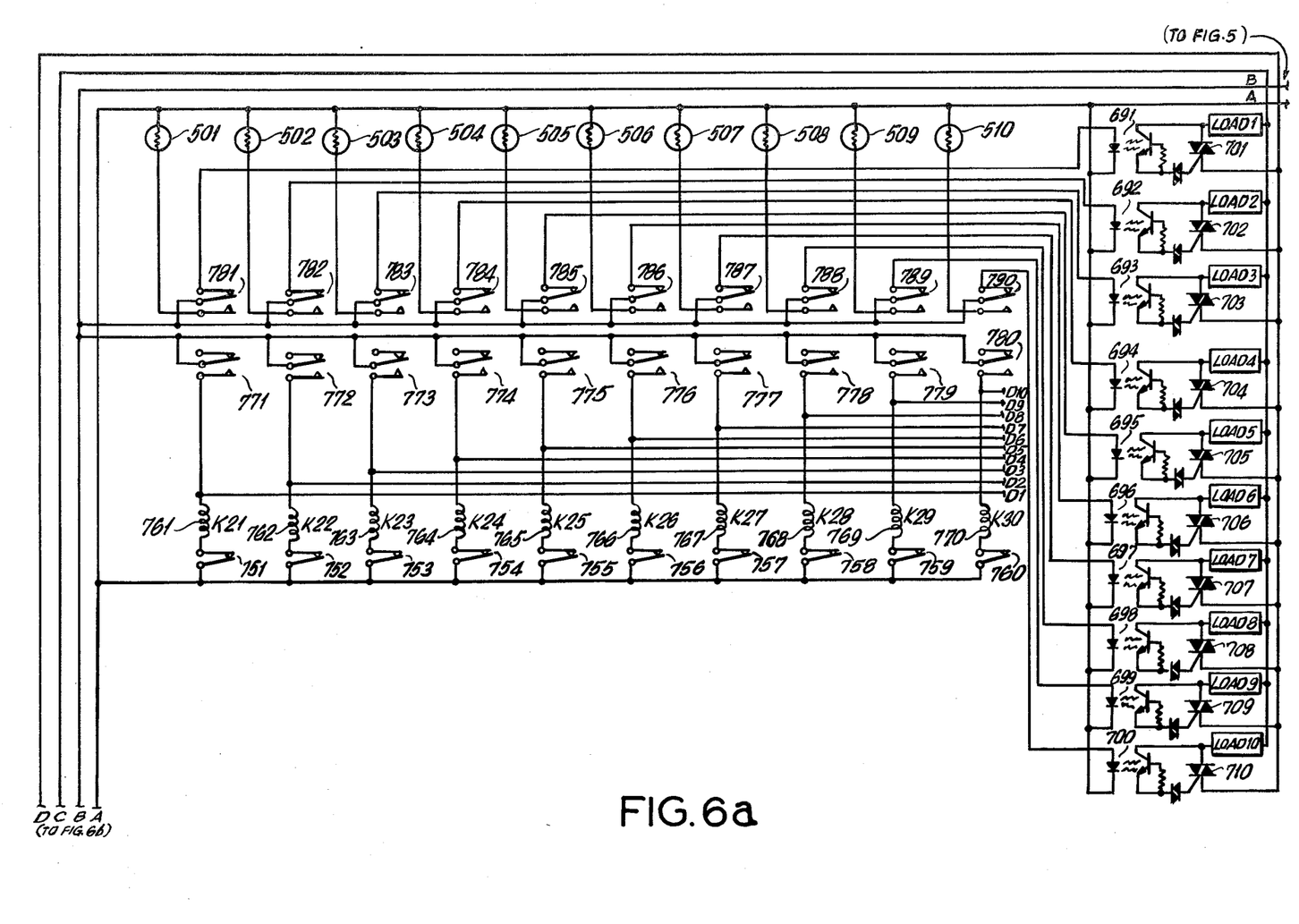
Figure 6B:
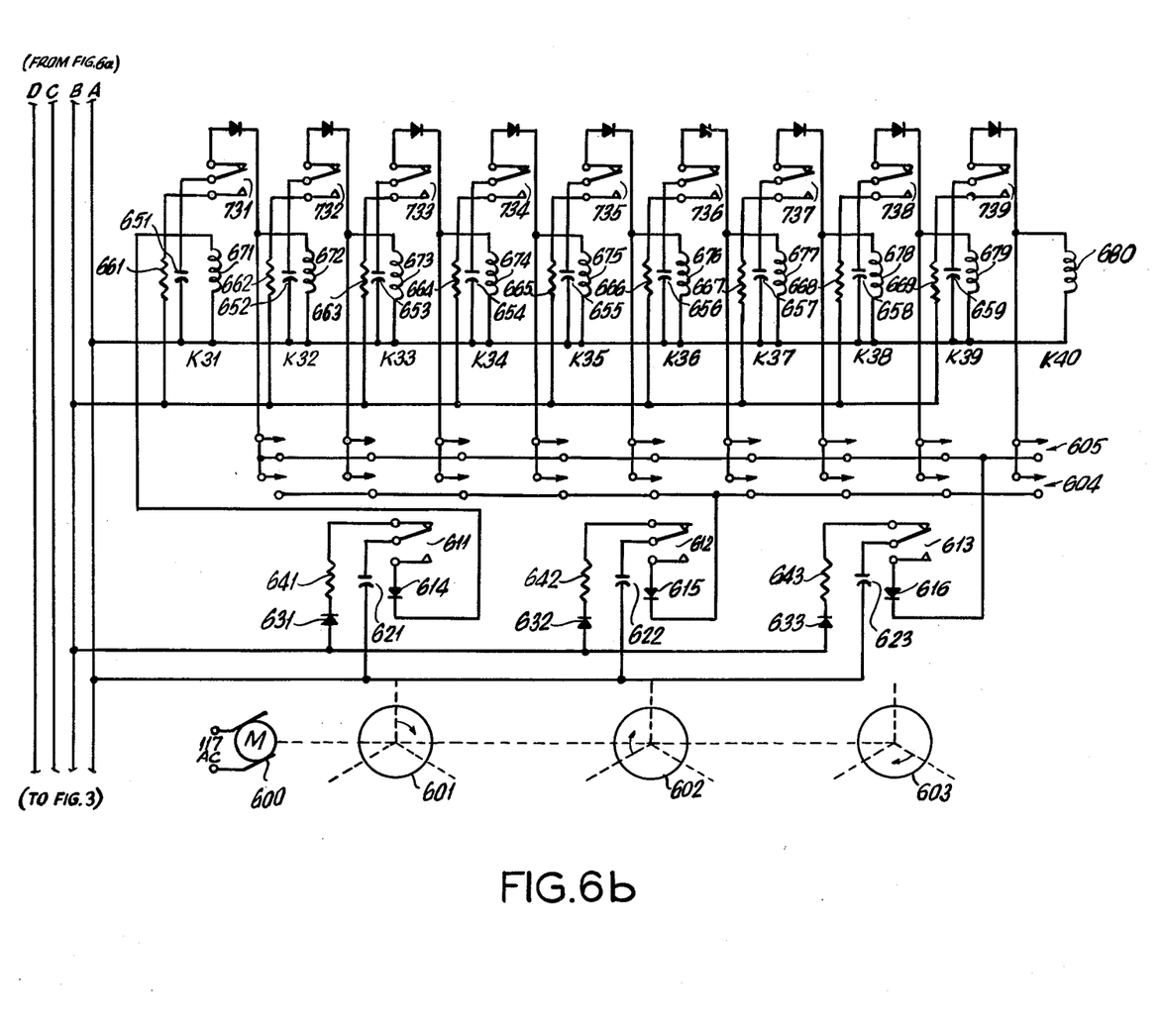

The shed circuits 24 are schematically depicted in FIG. 6, and include shed relays K21 to K30 and associated circuitry. The shed relays serve to normally maintain the light emitting diodes (LED's) 691-700 of the individual disconnect circuits in an energized condition when the corresponding item of load equipment is permitted to operate, and to disconnect the appropriate LED when an item of load equipment is shed. Each shed relay serves an additional function of energizing a display lamp (501 to 510) which indicates on the front panel (FIG. 1) that a particular load is in shed status.

The stationary contacts of bank 3 of stepping switch SS-2 (FIG. 4) are connectable to windings 761-765 of relays K21-K25 (FIG. 6) via isolating diodes (shown in FIG. 4) and connectors D1-D5 respectively. The stationary contacts of bank 4 of stepping switch SS-2 (FIG. 4) are connectable to windings 766-770 of relays K26-K30 (FIG. 6) via isolating diodes and connectors D6-D10 respectively. Normally open contacts 771-780 of relays K21-K30 are connected between the plus supply and the respective windings 761-770 to provide relay holding circuits. The other ends of windings 761-770 are coupled to ground via the normally closed contacts 751-760 of relays K31-K40.

Movable contacts 781-790 of relays K21-K30 are connected to the plus supply, the associated normally open contacts being connected to indicator lamps 501-510, respectively, and the associated normally closed contacts being connected to LED's 691-700.

When a shed pulse is generated by capacitor 254 and relay K4 (FIG. 4), the pulse passes via contacts 442, 423 and 432, via one of the stationary contacts of banks 3 or 4 of stepping switch SS-2 and one of the connectors D1-D10 to energize a selected one of the windings 761-770 of relays K21-K30 (FIG. 6). If the shed pulse is applied via connector D1, for example, winding 761 of relay K21 is momentarily energized and thereafter is maintained in the energized state by the holding circuit completed through contacts 771 and 751. When relay K21 is energized contacts 781 extinguish LED 691 and illuminate lamp 501 indicating that load 1 is in the shed condition. The holding circuit maintains relay K21 in the energized state until relay K31 in the Sequential Load Reset Circuit (to be described hereinafter) is energized. When relay K31 is momentarily energized, contacts 751 open, thereby returning relay K21 to the de-energized state, which in turn energizes LED 691 through contact 781 to restore load 1 to the operative condition. Shed pulses applied to windings 762-770 similarly control LED's 692-700 and indicator lamps 502-510.

DISCONNECT CIRCUITS

FIG. 6 schematically illustrates the individual disconnect circuits 18, in the form of optically coupled solid state switches (LED triggered Triacs). The solid state switches are preferably mounted on a master heat sink installed next to the main circuit breaker for the installation.

Each solid state switch contains an LED (691 to 700), optically coupled to the trigger circuit of an associated Triac (701 to 710). The Triac is maintained in the conductive state whenever the LED is energized and illuminated. Triac's 701-710 are connected in series with loads 1-10, respectively and, thus, the load can be operated whenever the Triac is conductive. The combination LED/Triac units schematically illustrated in FIG. 6 are commercially available as pre-packaged unit.

SEQUENTIAL LOAD RESET CIRCUIT

FIG. 6 schematically illustrates the sequential load reset circuit 25, including relays K31-K40, which is used to periodically restore shed loads by periodically de-energizing relays K21-K30 of the shed circuits.

The reset times are controlled by a clock motor 600 which drives cams 601, 602 and 603, which, in turn, operate microswitches 611, 612 and 613 respectively. The cams are designed to actuate the associated microswitches in suitable time multiples, e.g., 5, 10 and 20 minutes, cam 603 providing the shortest time interval and cam 601 providing the longest.

The movable contacts of microswitches 611-613 are connected to ground via capacitors 621-623, respectively, and the associated normally closed contacts are connected to the plus supply, respectively, via resistors 641-643 and series diodes 631-633. The normally open contact of microswitch 611 is connected to winding 671 of relay K31 via diode 614. The normally open contact of microswitch 612 is connectable to a selected one of windings 672-680 through diode 615 and via switch array 604 and the normally open contact of microswitch 613 is connectable to a selected one of windings 672-680 through diode 616 and via switch array 605.

Movable contacts 731-739 of relays K31-K39 are coupled to ground via capacitors 651-659, respectively, and the associated normally open contacts are connected to the plus supply via charging resistors 661-669. The normally closed contacts of relay K31 (associated with movable contact 731) are coupled to winding 672 of adjacent relay K32 via an isolating diode. The normally open contacts of relays K32-K39 are likewise connected to the windings of adjacent relays K33-K40 via respective isolating diodes.

As previously mentioned, contacts 751-760 of relays K31-K40 are connected in the ground path for the windings of relays K21-K30.

The operation of the sequential load reset circuit is explained assuming that switch arrays 604 and 605 are set connecting microswitch 612 to winding 673 of relay K33 and microswitch 613 to winding 677 of relay K37.

At the end of each 5 minute interval cam 603 actuates microswitch 613 to couple charged capacitor 623 to winding 677, and thereby to momentarily energize relay K37 for a period of time determined by the capacitor time constant. Contacts 757 of relay K37 open the ground path for winding 767 of relay K27 and therefore if relay K27 is energized (corresponding to load 7 in the shed condition), relay K27 will be returned to the de-energized state and load 7 will be restored to the operative state. While relay K37 is momentarily energized capacitor 657 is charged so that when relay K37 returns to the de-energized state the charged capacitor is coupled to winding 678 of adjacent relay K38. Momentary energization of relay K38 restores load 8 and charges capacitor 658. In similar fashion, relay K39 is momentarily energized next to restore load 9 and finally relay K40 is momentarily energized to restore load 10.

At the end of the 10 minute interval cam 602 actuates microswitch 612 so that capacitor 622 momentarily energizes relay K33. The energized state ripples down the line energizing relays K33-K40 in sequence, thereby restoring the loads one at a time. At the end of the 20 minute interval cam 601 actuates microswitch 611 and therefore capacitor 621 momentarily energizes relay K31. The energized state likewise ripples down the line restoring all the loads in sequence.

The sequential restoration of the loads is desirable to avoid large surges that might arise if all loads were restored simultaneously. Any desired set of reset times can be achieved by suitable selection of cams for timer 600. Any desired mix of short, intermediate or long reset times can be achieved by appropriate setting of switch arrays 604 and 605. For convenience of illustration, loads 1-10 are shown associated with relays K21-K30 respectively. The interconnection between the loads and relays K21-K30 in an actual installation, however, would vary so that the appropriate reset times could be achieved as desired for each load.

PANEL DISPLAY

Returning to FIG. 1, the "Loads On" lamps 33 correspond to lamps 171 through 180 of FIG. 5; when, for example, load 4 is turned on, lamp 174 is lit and illuminates "Loads On" light number 4 on the front panel display. Shed circuit lamps 501-510 of FIG. 6 correspond to the "Loads Shed" display 34 of FIG. 1. Thus, for example, if load 4 is in shed condition, "Loads Shed" light number 14 is illuminated. Thus, lamps 171 and 501 are associated with load 1 and supply line 101, lamps 172 and 502 with load 2 and supply line 102, etc. When neither lamp in the associated pair is lit, the load is not operating only because of its own internal demand conditions or because its on-off switch has been turned off.

Actual instantaneous current being supplied to the installation is displayed on an AC ammeter 31, previously discussed. Allowable current is displayed on meter 30. The indication on meter 30 changes automatically from period to period depending on the programming of the system. The change occurs with each advance of stepping switch SS-1, corresponding to commencement of a new time period.

Zero Reset button 35 and Period Advance button 37 have been previously described.

CONNECTION OF LOADS

For purposes of simplicity, operation of the system has been described with loads 1 through 5 connected to low load sensing bank 1 of SS-2, and loads 6 through 10 connected to high load sensing bank 2 of SS-2. Furthermore, load 1 has been shown as being connected to shed relay K21 in shed circuit 40, load 2 to shed relay K22, and so on in numerical order.

However, for proper utilization of the system's high/low overdraw discrimination capability, its priority alignment and its sequential load reset, each individual load should be connected to the system in accordance with its relative current rating and its operating requirements.

Thus, if a particular load can be categorized as a "low" current-drawing load, it should be connected as one of loads 1 through 5. Furthermore, if the load can be readily shed, it should be connected as one of loads 1, 2, 3, or 4; if it cannot be readily shed, but is preferably left in operative condition until all available loads of like magnitude are shed, then it should be connected as load 5.

As to its reset requirements, if the load cannot efficiently withstand more than five minutes in a shed status, then, as previously explained, its associated solid state switch 691-695, its associated connector D1-D5, and its associated lamp 501-505 should be connected to one of the shed relays which will be reset every five minutes by timed operation of cam 603 in sequential load reset circuit 25 (FIG. 6).

The foregoing specification describes an illustrative embodiment of the invention. It should be obvious that there are numerous variations within the scope of the invention, which is more particularly defined in the appended claims. For example, the current sensing function performed in the illustrative embodiment by current transformer could be performed instead by Hall effect current sensors.

We claim:

1. A system for monitoring and controlling the electrical amperage draw of an installation supplied by an electrical supply line, said installation having therein a number of individual loads to be controlled, said loads being supplied by respective load lines, and for decreasing the instantaneous amperage draw of the installation to within a pre-selected allowable maximum whenever the amperage draw exceeds that maximum, comprising:
   supply line sensing means magnetically coupled to the electrical supply line for generating a supply line sensing signal proportional to the amperage flowing in the supply line;
   allowable load set point programming means for selecting the maximum allowable amperage draw, and for receiving the supply line sensing signal from the supply line sensing means, to generate an overdraw signal whenever the amperage flowing in the supply line exceeds the allowable maximum;
   period programming means for generating a time signal at pre-selected intervals and means responsive to said time signal for causing said allowable load set point programming means to change the maximum allowable amperage draw to a new pre-selected value;
   individual load sensing means magnetically coupled to each of the load lines for generating a load sensing signal for each individual load to indicate whether the individual load is operating;
   control means for receiving the overdraw signal from the allowable load set point programming means and the load sensing signals from the individual load sensing means, and for generating a shed signal directing the shedding of a particular one of the operating individual loads so as to decrease the electrical amperage draw of the installation; and
   shed means electrically connected to the individual loads for receiving the shed signal from the control means and for disconnecting the particular individual load.

2. A system according to claim 1 wherein said means responsive to said time signal forms a part of said allowable load set point programming means.

3. A system for monitoring and controlling the electrical amperage draw of an installation supplied by an electrical supply line, said installation having therein a number of individual loads to be controlled, said loads being supplied by respective load lines, and for decreasing the instantaneous amperage draw of the installation to within a pre-selected allowable maximum whenever the amperage draw exceeds that maximum, comprising:
   supply line sensing means magnetically coupled to the electrical supply line for generating a supply line sensing signal proportional to the amperage flowing in the supply line;
   allowable load set point programming means for selecting the maximum allowable amperage draw, and for receiving the supply line sensing signal from the supply line sensing means, to generate an overdraw signal whenever the amperage flowing in the supply line exceeds the allowable maximum;
   period programming means for generating a time signal at pre-selected intervals, and means responsive to said time signal for causing said allowable load set point programming means to change the maximum allowable amperage draw to a new pre-selected value;
   individual load sensing means magnetically coupled to each of the load lines for generating a load sensing signal for each individual load to indicate whether the individual load is operating;
   relative load connection means for connecting the load line of each individual load into one of a number of relative groupings according to the amount of amperage drawn by said load;
   relative overdraw sensing means responsive to the selected maximum allowable amperage and to the supply line sensing signal for generating a further overdraw signal whenever the amperage flowing in the supply line exceeds the selected maximum allowable amperage by more than a pre-selected overdraw value;
   control means for receiving the overdraw signal from the allowable load set point programming means and the load sensing signals from the individual load sensing means, and for generating a shed signal directing the shedding of one of the operating individual loads so as to decrease the electrical amperage draw of the installation;
   relative load control means responsive to said further overdraw signal and to the relative connection of the load lines for directing the shed signal generated by the control circuit so as to cause the shedding of a load in the grouping having an amperage draw corresponding relatively to the amount by which the amperage flowing in the supply line exceeds the selected maximum allowable amperage; and
   shed means electrically connected to the individual loads for receiving the shed signal from the relative load control means, and for disconnecting the particular individual load.

4. A system according to claim 3 wherein said relative load connection means forms part of said individual load sensing means, said relative overdraw sensing means forms part of said allowable load set point programming means, and said relative load control means forms part of said control circuit.

5. A system according to claim 3, further comprising sequential load reset means for periodically returning to an operative status all individual loads then disconnected as a result of any previous shed signal, the returning to operative status of more than one load taking place on a sequential time-delayed basis.

6. A system according to claim 5 wherein said sequential load reset means includes means for selectively resetting individual loads at different periodic intervals.

7. A system according to claim 6, further comprising shed priority alignment means responsive to the shed signal from said control means for automatically realigning the order in which the individual loads in each grouping will be shed upon the occurrence of the next shed signal from the control means.

8. A system according to claim 7, further comprising shed priority alignment means responsive to the shed signal from said control means for automatically realigning the order in which selected individual loads in each grouping will be shed upon the occurrence of the next shed signal from the control means, while maintaining the remaining non-selected individual loads last in order of shedding priority in each grouping.

9. A system for monitoring and controlling the electrical amperage draw of an installation supplied by an electrical supply line, said installation having therein a number of individual loads to be controlled, said loads being supplied by respective load lines, and for decreasing the instantaneous amperage draw of the installation to within a pre-selected allowable maximum whenever the amperage draw exceeds that maximum, comprising:

supply line sensing means magnetically coupled to the electrical supply line for generating a supply line sensing signal proportional to the amperage flowing in the supply line;

allowable load set point programming means for selecting the maximum allowable amperage draw, and for receiving the supply line sensing signal from the supply line sensing means, to generate an overdraw signal whenever the amperage flowing in the supply line exceeds the allowable maximum;

period programming means for generating a time signal at pre-selected intervals, and means responsive to said time signal for causing said allowable load set point programming means to change the maximum allowable amperage draw to a new pre-selected value;

individual load sensing means magnetically coupled to each of the load lines for generating a load sensing signal for each individual load to indicate whether the individual load is operating;

relative load connection means for connecting the load line of each individual load into one of two groupings, a first grouping for loads having an amperage draw above some selected load value, and a second grouping for loads having an amperage draw below the selected load value;

relative overdraw sensing means responsive to the selected maximum allowable amperage and to the supply line sensing signal for generating a second overdraw signal whenever the amperage flowing the the supply line exceeds the selected maximum allowable amperage by more than a pre-selected overdraw value;

control means for receiving the overdraw signal from the allowable load set point programming means and the load sensing signals from the individual load sensing means, and for generating a shed signal directing the shedding of one of the operating individual loads so as to decrease the electrical amperage draw of the installation;

relative load control means responsive to the second overdraw signal and to the relative connection of the load lines, for directing the shed signal generated by the control circuit so as to cause the shedding of a load in the first grouping of loads whenever the excess amperage flowing in the supply lines is greater than the pre-selected overdraw value, and to cause the shedding of a load in the second grouping when the excess amperage flowing in the supply line is less than the pre-selected overdraw value; and shed means electrically connected to the individual loads for receiving the shed signal from the relative load control means and for disconnecting the particular individual load.

10. A system according to claim 9 wherein said relative load connection means forms part of said individual load sensing means, said relative overdraw sensing means forms part of said allowable load set point programming means, and said relative load control means forms part of said control circuit.

11. A system for monitoring and controlling the electrical amperage draw of an installation supplied by an electrical supply line, said installation having therein a number of individual loads to be controlled, said loads being supplied by respective load lines, and for decreasing the instantaneous amperage draw of the installation to within a pre-selected allowable maximum whenever the amperage draw exceeds that maximum, comprising:

supply lines sensing means magnetically coupled to the electrical supply line for generating a supply line sensing signal proportional to the amperage flowing in the supply line;

allowable load set point programming means for selecting the maximum allowable amperage draw, and for receiving the supply line sensing signal from the supply line sensing means, to generate an overdraw signal whenever the amperage flowing in the supply line exceeds the allowable maximum;

period programming means for generating a time signal at pre-selected intervals and means responsive to said time signal for causing said allowable load set point programming means to change the maximum allowable amperage draw to a new pre-selected value;

individual load sensing means magnetically coupled to each of the load lines for generating a load sensing signal for each individual load to indicate whether the individual load is operating;

control means for receiving the overdraw signal from the allowable load set point programming means and the load sensing signals from the individual load sensing means, and for generating a shed signal directing the shedding of a particular one of the operating individual loads so as to decrease the electrical amperage draw of the installation;

shed means electrically connected to the individual loads for receiving the shed signal from the control means and for disconnecting the particular individual load; and sequential load reset means for periodically returning to an operative status all individual loads then disconnected as a result of any previous shed signal, the returning to operative status of more than one load taking place on a sequential time-delayed basis.

12. A system according to claim 11 wherein said sequential load reset means includes means for selectively re-setting individual loads at different periodic intervals.

13. A system according to claim 12, further comprising shed priority alignment means responsive to the shed signal from said control means for automatically realigning the order in which the individual loads will be shed upon the occurrence of the next shed signal from the control means.

14. A system according to claim 12, further comprising shed priority alignment means responsive to the shed signal from said control means for automatically realigning the order in which selected individual loads will be shed upon the occurrence of the next shed signal from the control means, while maintaining the remaining non-selected individual loads last in order of shedding priority.

15. A system for monitoring and controlling the electrical amperage draw of an installation supplied by an electrical supply line, said installation having therein a number of individual loads to be controlled, comprising:

a supply line sensor coupled to the electrical supply line for generating a supply line sensing signal proportional to the amperage flowing in the supply line;

an allowable load set point indicator for designating the maximum allowable amperage draw, and for receiving said supply line sensing signal from said supply line sensor, to generate an overdraw signal whenever the amperage flowing in the supply line exceeds the maximum allowable amperage draw;

control means for receiving the overdraw signal from said allowable load set point indicator for generating a shed signal directing the shedding of particular individual loads so as to decrease the electrical amperage draw of the installation;

a load shedding circuit electrically connectable to the individual loads for receiving said shed signal from said control means and for disconnecting said particular individual loads, said load shedding circuit including a shed priority control circuit for changing the shedding sequence of the individual loads on different shed cycles following occurrence of said overdraw signal; and a timer for controlling the period during which individual loads are shed, said timer being connected to said load shedding circuit for re-connecting individual loads after being disconnected for predetermined time intervals to thereby create an overdraw to initiate a new shed cycle and the shedding of a different load.

16. A system for monitoring and controlling the electrical amperage draw of an installation supplied by an electrical supply line, said installation having therein a number of individual loads to be controlled, comprising:

a supply line sensor coupled to the electrical supply line for generating a supply line sensing signal proportional to the amperage flowing in the supply line;

an allowable load set point indicator for designating the maximum allowable amperage draw, and for receiving said supply line sensing signal from said supply line sensor, to generate an overdraw signal whenever the amperage flowing in the supply line exceeds the maximum allowable amperage draw;

control means for receiving the overdraw signal from said allowable load set point indicator for generating a shed signal directing the shedding of particular individual loads so as to decrease the electrical amperage draw of the installation;

a load shedding circuit electrically connectable to the individual loads for receiving said shed signal from said control means and for disconnecting said particular individual loads;

a timer for controlling the period during which individual loads are shed, said timer being connected to said load shedding circuit for re-connecting individual loads after being disconnected for predetermined time intervals;

period programming means for generating a time signal at pre-selected intervals;

and means responsive to said time signal for causing said allowable load set point indicator to change the maximum allowable amperage drawn to a new pre-selected value.

17. The system according to claim 16 wherein said load shedding circuit further includes a shed priority control circuit for changing the shedding sequence of the individual loads on different shed cycles following occurrence of said overdraw signal.

18. The system according to claim 17 wherein said shed priority control circuit has a shed priority sequence wherein certain pre-selected individual loads are always shed last.

* * * * *